United States Patent [19]
Yonemitsu et al.

[11] Patent Number: 5,939,111
[45] Date of Patent: *Aug. 17, 1999

[54] PROCESS FOR THE PRODUCTION OF HIGHLY CONCENTRATED EXTRACTS FOR FOOD USE

[75] Inventors: Muneaki Yonemitsu; Tomoyo Okamura; Atsuo Nishikawa; Haruki Omura, all of Kawasaki, Japan

[73] Assignee: Ajinomoto Co., Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/567,981

[22] Filed: Dec. 11, 1995

[51] Int. Cl.$^6$ ........................................................ A23L 1/31
[52] U.S. Cl. .............................. 426/56; 426/55; 426/492; 426/650; 426/655; 426/657
[58] Field of Search ............................. 426/56, 492, 655, 426/656, 657, 55, 490, 534, 650

[56] References Cited

U.S. PATENT DOCUMENTS

| | | | |
|---|---|---|---|
| 438,333 | 10/1890 | Van Ruymbeke et al. | 426/437 X |
| 5,468,491 | 11/1995 | Targan | 424/195.1 |

FOREIGN PATENT DOCUMENTS

| | | | |
|---|---|---|---|
| 2 308 320 | 11/1976 | France . | |
| 227878 | 2/1985 | German Dem. Rep. | 426/655 |
| 59-151868 | 8/1984 | Japan | 426/655 |
| 60-180 566 | 9/1985 | Japan . | |
| 61-239863 | 10/1986 | Japan | 426/655 |

OTHER PUBLICATIONS

Masuda, Patent Abstracts of Japan, Abstracting 02–222641, Sep. 1990.

Shoji et al., Patent Abstracts of Japan, Abstracting 06–153863, Jun. 1994.

Shoji et al., Patent Abstracts of Japan, Abstracting 06–340484, Dec. 1994.

*Primary Examiner*—Leslie Wong
*Attorney, Agent, or Firm*—Oblon, Spivak, McClelland, Maier & Neustadt, P.C.

[57] ABSTRACT

A process for producing a highly concentrated extract for food use which includes effecting molecular weight reduction (viscosity reduction) of a raw material extract using a proteolytic enzyme prior to its concentration, or effecting viscosity reduction of the extract by keeping it for a long period of time at a high temperature prior to its concentration or simultaneously carrying out the concentration step, and subsequently concentrating the treated extract to a predetermined concentration, the highly concentrated extract for food use being able to be distributed at ordinary temperature even in the absence of salt and have fluidity.

3 Claims, 2 Drawing Sheets

PROCESS FOR THE PRODUCTION OF HIGHLY CONCENTRATED EXTRACTS FOR FOOD USE

BACKGROUND OF THE INVENTION 1. (Field of the Invention)

This invention relates to a novel production process of highly concentrated extracts for food use.

2. (Prior Art)

In the case of extracts for food use which are broadly used in processed food, such as livestock meat extracts, poultry extracts, fish extracts, yeast extracts and the like, they are concentrated after their extraction from raw materials with the aim of reducing water activity and thereby effecting prevention of their putrefaction. However, when the water activity is adjusted only by means of concentration to about less than about 0.9, said value being generally said to be effective in preventing putrefaction, it is necessary to concentrate an extract to a Brix degree of about 70% or more, which causes a difficulty in effecting such concentration itself due to the foaming resultant from the increased viscosity, and the resulting highly concentrated extract is a gel form having poor fluidity and therefore is difficult to use. In general, therefore, in order to prevent putrefaction and secure fluidity of the product, concentration of an extract is held up at a Brix degree of approximately 40 to 50%, and the water activity is adjusted to approximately less than 0.9 by adding about 10 to 15% of sodium chloride to the extract concentrated to such a degree.

However, with the increasing intention for health and therefore for low salt food, development of salt-free extracts has been called for by processed food makers. In general, salt-free extracts are distributed by freezing them or after their retort sterilization or aseptic treatment, except for South American beef extracts which are concentrated to a Brix degree of as much as 80%.

Such beef extracts, however, are in the form of hard gel even at ordinary temperature and have no fluidity. Also, there is a problem of increased distribution cost in the case of freezing or increased initial plant and equipment investment in the case of retort sterilization and aseptic treatment. As it is universally known, the term retort sterilization means a heat-under-pressure sterilization treatment using sealed packing materials, and the term aseptic treatment means a treatment in which a sterilized product to be packed is packed in a previously sterilized container under aseptic conditions.

(PROBLEMS TO BE RESOLVED BY THE INVENTION)

In view of the above, it is therefore an object of the present invention to establish a pre-treatment process for the production of highly concentrated extracts for food use, by which extracts from raw materials can be concentrated to such a high Brix degree, say about 70% or more, that their putrefaction can be prevented while keeping their fluidity.

SUMMARY OF THE INVENTION

With the aim of overcoming the aforementioned problems, the inventors of the present invention have conducted intensive studies and found that extracts for food use having intended qualities, namely highly concentrated extracts for food use, can be produced by employing an enzyme treatment or a high temperature, long time heat treatment, thereby accomplishing the present invention.

Accordingly the present invention relates to a process for the production of highly concentrated extracts for food use, which comprises concentrating an extract from a raw material after subjecting it to a viscosity reducing treatment by a heat treatment or an enzyme treatment.

DETAILED DESCRIPTION OF THE INVENTION

Figure 1:
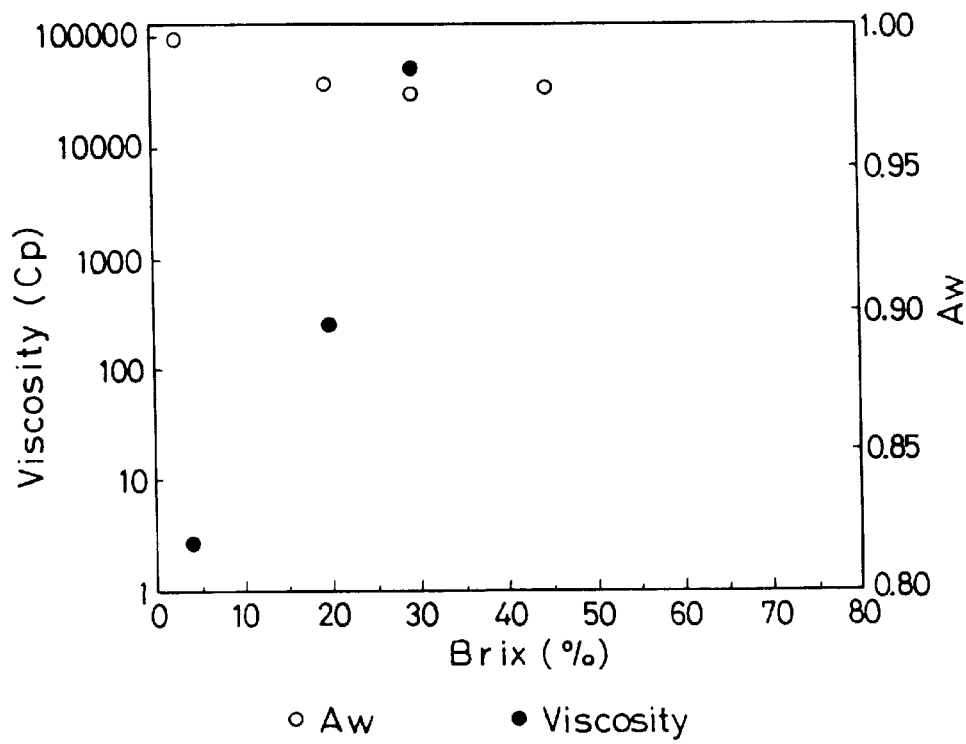
FIG. 1 is a graph showing changes in the viscosity and water activity when a raw material extract is concentrated without carrying out a viscosity reducing treatment (Example 1).

The following describes the present invention in detail.

According to the production process of extracts for food use of the present invention, any of the prior art food extract production processes including raw materials to be extracted can be employed with no particular limitation, except for the viscosity reducing treatment which is one of the greatest features of the present invention. As it is universally known, raw materials as the extraction source of livestock meat extracts include bones, waste flesh, internal organs and the like of cattle, swine, horse, sheep, goat and the like domestic animals, those of poultry extracts include bones, waste flesh, internal organs and the like of domestic fowl, ducks, geese, turkeys and the like poultry, those of fish extracts include oysters, crabs, scallops and the like, and those of yeast extracts include waste cells and cultured cells of yeasts. Extraction of these raw materials to be extracted is also carried out in the usual way using appropriate extraction solvents or not particularly using extraction solvents (cf. Examples which will be described later), and the resulting extracts are optionally subjected to purification, concentration and the like treatments to obtain highly concentrated extract products for food use. In this connection, the present invention is particularly effective when extraction solvents are not used (cf. Examples).

The following will be focused on the viscosity reducing treatment.

In the process of the present invention, each raw material is firstly subjected to an extraction treatment to obtain an extract. This step is not different from that as in the usual extract production method.

Next, the thus obtained extract is subjected to the viscosity reducing treatment of the present invention.

The heat treatment as a means of the viscosity reduction is after all a heat treatment of the above extract which is carried out under such conditions that the intended viscosity reducing effect of the present invention is realized, for example by 3 to 72 hours of heating at 60 to 120° C. As occasion demands, concentration of the extract may be carried out during the heat treatment, thus partly or wholly effecting the subsequent concentration step.

In this connection, the present invention is a process in which extracts are produced by applying a long period of heating which is usually avoided because of its influence for causing quality deterioration.

Similar to the case of heat treatment, the enzyme treatment as another means of the viscosity reduction is after all an enzyme treatment of the raw material extract which is carried out under such conditions that the intended viscosity reducing effect of the present invention is obtained.

Since protein is the main component which causes viscosity when such extracts are concentrated, the enzyme to be used in the enzyme treatment of the present invention is a protein hydrolyzing enzyme for food use which is not particularly limited. As a matter of course, the protein hydrolyzing enzyme may be in the form of an enzyme preparation which contains a proteolytic enzyme as an enzyme active component. Examples of commercially available proteolytic enzymes for food use include "Protin PC10" manufactured by Daiwa Kasei.

In the enzyme treatment, an extract from a raw material is treated with an enzyme under such conditions that the object of the present invention is achieved, more illustratively, the enzyme is added to the extract and the mixture is kept under optimum temperature, time and the like conditions for the enzyme reaction.

The raw material extract after completion of the viscosity reducing treatment is then concentrated to obtain a highly concentrated extract product for food use, and, according to the present invention, the concentration step can be handled extremely easily and the extract can be concentrated extremely easily until its water activity reaches about 0.9 or less which is effective in preventing its putrefaction. In addition, the product obtained by concentrating to such a degree still has fluidity and can be used with no problems.

In this instance, the measure of the fluidity which does not cause problems when used is 10,000 Cp or less measured by a Brookfield type rotary viscometer. The measurement is carried out at 30° C. for 1 minute at 30 rpm.

(EXAMPLES)

The following examples are provided to further illustrate the present invention.

Example 1

(Enzyme treatment)

Frozen chicken bones were subjected to 2 hours of pressure extraction at 115° C. in an autoclave, and the residue and oil were separated to obtain an extract having a Brix degree of 4.7%. A portion of the extract was mixed with a proteolytic enzyme "Protin PC10" (manufactured by Daiwa Kasei) in an amount of 0.4% based on the solid content of the extract and kept at 50 to 55° C. for 60 minutes to effect the enzyme treatment. The thus treated extract was then concentrated under reduced pressure to produce a chicken extract (Inventive product (1)) having a Brix degree of 75%, a water activity of 0.88 and a viscosity of 5,800 Cp (measured by the aforementioned viscometer under the same conditions).

For the sake of comparison, a control chicken extract for trial (control product) was produced in the same manner except that the enzyme treatment was omitted.

Changes in the viscosity and water activity (Aw) when concentrated with no enzyme treatment are shown in FIG. 1. As is evident from the figure, the viscosity increased sharply as the concentration progressed so that the extract could not be concentrated to a Brix degree of 40% or more.

Figure 2:
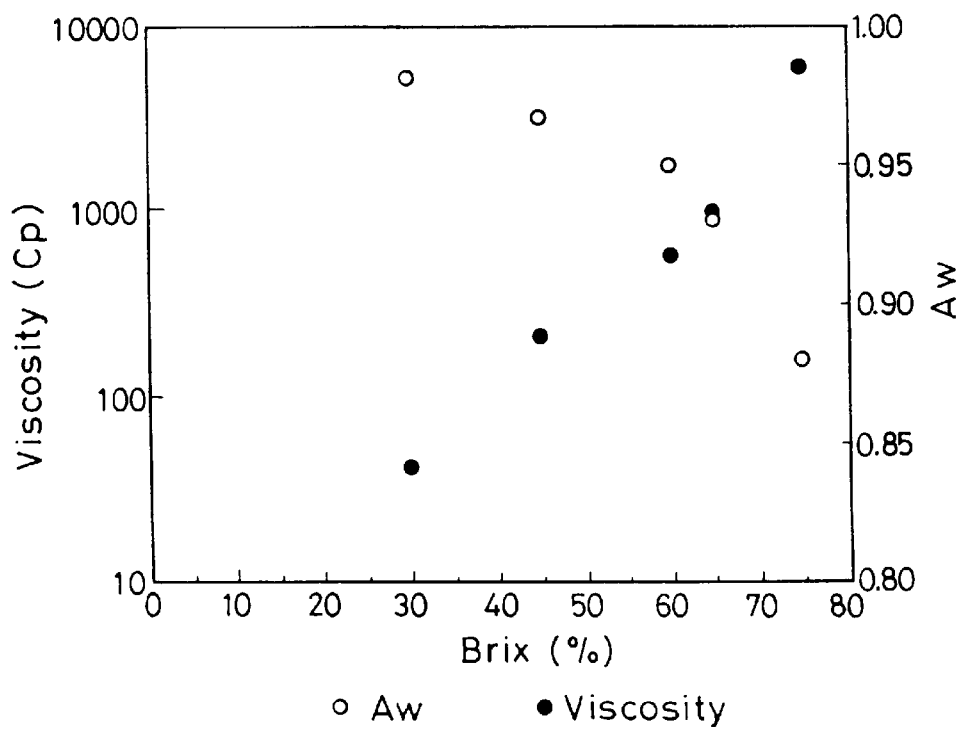
FIG. 2 is a graph showing similar changes when an enzyme treatment is employed (Example 1).

On the contrary, when the enzyme treatment was carried out, increase in the viscosity was gradual and the extract was able to be concentrated to the desired water activity while keeping its fluidity. The results are shown in FIG. 2.

Since Inventive product (1) showed excellent fluidity at ordinary temperature and was free from the propagation of microorganisms except for fungi, it was able to distribute the product at ordinary temperature by a hot packing (growth of fungi is repressed thereby).

Example 2

(Heat treatment)

Figure 3:
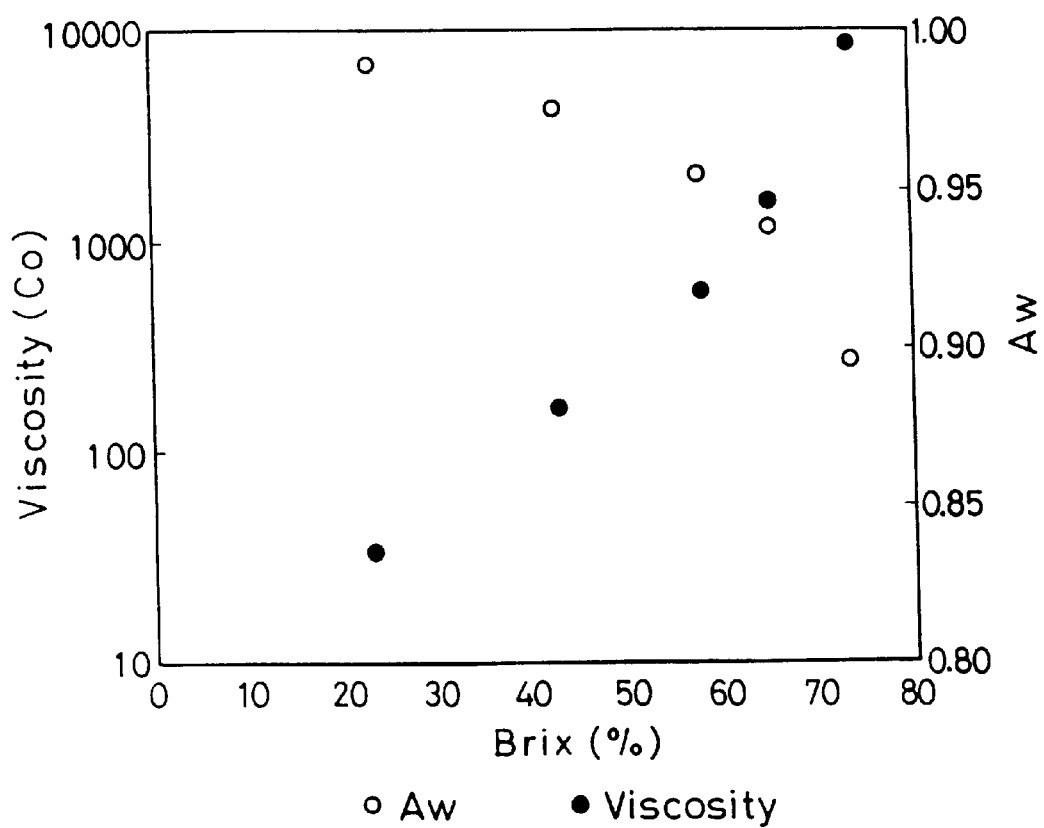
FIG. 3 is a graph showing similar changes when a heat treatment is employed (Example 2).

A remaining portion of the extract having a Brix degree of 4.7% obtained in Example 1 was kept at 97° C. for 48 hours and then concentrated under reduced pressure to produce a chicken extract (Inventive product (2)) having a Brix degree of 73%, a water activity of 0.89 and a viscosity of 8,700 Cp (measured by the aforementioned viscometer under the same conditions). Changes in the viscosity and water activity when concentrated after the heat treatment are shown in FIG. 3. Similar to the case of Inventive product (1), increase in the viscosity was gradual and the extract was able to be concentrated to the desired water activity while keeping its fluidity.

Also, similar to the case of Inventive product (1), Inventive product (2) showed excellent fluidity at ordinary temperature and was free from the propagation of microorganisms except for fungi, so that it was able to distribute the product at ordinary temperature by a hot packing because of the same reason described above.

(Effect of the Invention)

The present invention has rendered possible low cost production and provision of fluid highly concentrated extracts for food use which can be distributed at ordinary temperature even in the salt-free or low salt form and facilitated the development of low salt type processed food.

What is claimed is:

1. The process of producing a highly concentrated fluid extract for food use from a protein containing fluid extract of raw meat or raw bones of domestic animals or poultry, such fluid raw meat or raw bone extract being one which when concentrated to reduce the water activity of the fluid raw material extract to less than 0.9 converts to gel form and which is free of added salt, which comprises subjecting the fluid raw meat or bone extract to a step of viscosity reducing treatment which is a heat treatment or enzyme treatment, and thereafter subjecting the viscosity reduced extract to the step of concentrating the treated fluid raw meat or raw bone extract so that its water activity is less than 0.9 without addition of salts, wherein the viscosity reducing treatment is sufficient to reduce the viscosity to 10,000 cp or less when measured by a Brookfield type rotary viscometer at 30° C. for one minute at 30 rpm when the water activity is decreased by concentration to less than 0.9.

2. The process according to claim 1 wherein the viscosity reducing step is an enzyme treatment step.

3. The process of claim 1 wherein the viscosity reducing step is a heat treatment step and the step of concentrating the fluid extract is partly carried out during the step of heat treatment.

* * * * *